United States Patent [19]

Hansen et al.

[11] Patent Number: 5,175,265

[45] Date of Patent: Dec. 29, 1992

[54] AZO DYES WITH A DIAZO COMPONENT OF THE 4-AMINO-7-NITROBENZISOTHIAZOLE SERIES AND A COUPLING COMPOUND FROM THE AMINOPYRAZOLE OR HYDROXYPYRIDONE SERIES

[75] Inventors: Guenter Hansen, Ludwigshafen; Helmut Hagen, Frankenthal; Helmut Reichelt, Neustadt, all of Fed. Rep. of Germany

[73] Assignee: BASF Aktiengesellschaft, Ludwigshafen, Fed. Rep. of Germany

[21] Appl. No.: 488,868

[22] Filed: Mar. 5, 1990

[30] Foreign Application Priority Data

Mar. 30, 1989 [DE] Fed. Rep. of Germany ....... 3910289

[51] Int. Cl.⁵ .................... C09B 29/039; C09B 29/42; C09B 29/48; D06P 1/18
[52] U.S. Cl. .................................. 534/769; 534/766; 8/531; 8/532; 8/536; 8/691
[58] Field of Search ........................ 534/766, 768, 769

[56] References Cited

U.S. PATENT DOCUMENTS

| | | | |
|---|---|---|---|
| 3,639,387 | 2/1972 | Juergen et al. | 534/769 X |
| 4,650,860 | 3/1987 | Dehnert et al. | 534/766 |
| 4,929,720 | 5/1990 | Hansen et al. | 534/766 |

FOREIGN PATENT DOCUMENTS

| | | | |
|---|---|---|---|
| 0087037 | 8/1983 | European Pat. Off. | 534/766 |
| 2020479 | 11/1971 | Fed. Rep. of Germany | 534/611 |
| 2062717 | 6/1972 | Fed. Rep. of Germany | 534/768 |
| 2805304 | 8/1979 | Fed. Rep. of Germany | 534/766 |
| 3201268 | 7/1983 | Fed. Rep. of Germany | 534/766 |
| 2001665 | 2/1978 | United Kingdom | 534/768 |
| 2004561 | 4/1979 | United Kingdom | 534/765 |

*Primary Examiner*—Mary C. Lee
*Assistant Examiner*—Fiona T. Powers
*Attorney, Agent, or Firm*—Oblon, Spivak, McClelland, Maier & Neustadt

[57] ABSTRACT

Benzisothiazole-azo dyes useful for dyeing synthetic fiber materials have the formula

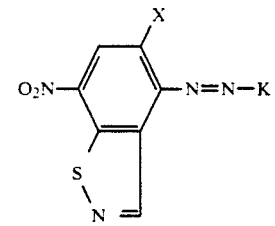

where
X is hydrogen, chlorine, bromine, cyano or nitro and K is a radical of the formula

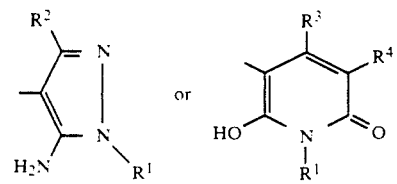

where
$R^1$ is substituted or unsubstituted $C_1$–$C_{12}$-alkyl, substituted or unsubstituted phenyl, $C_3$–$C_5$-alkenyl or $C_5$–$C_7$-cycloalkyl,
$R^2$ is hydrogen or $C_1$–$C_4$-alkyl,
$R^3$ is hydrogen or methyl and
$R^4$ is hydrogen, cyano, carbamoyl or $C_1$–$C_4$-alkoxycarbonyl.

9 Claims, No Drawings

AZO DYES WITH A DIAZO COMPONENT OF THE 4-AMINO-7-NITROBENZISOTHIAZOLE SERIES AND A COUPLING COMPOUND FROM THE AMINOPYRAZOLE OR HYDROXYPYRIDONE SERIES

The present invention relates to novel benzisothiazole-azo dyes of the formula I

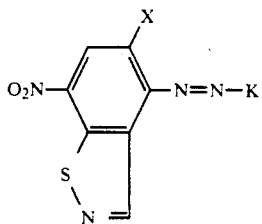

where
X is hydrogen, chlorine, bromine, cyano or nitro and K is a radical of the formula II or III

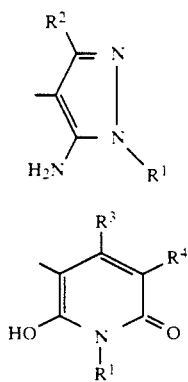

where
$R^1$ is substituted or unsubstituted $C_1$–$C_{12}$-alkyl which may be interrupted by one or more oxygen atoms, substituted or unsubstituted phenyl, $C_3$–$C_5$-alkenyl or $C_5$–$C_7$-cycloalkyl,
$R^2$ is hydrogen or $C_1$–$C_4$-alkyl,
$R^3$ is hydrogen or methyl and
$R^4$ is hydrogen, cyano, carbamoyl or $C_1$–$C_4$-alkoxycarbonyl,
and to their use for dyeing synthetic fiber materials.

DE-A-2 727 383 discloses azo dyes where the diazo component is based on 4-aminobenzisothiazole and the coupling component is a derivative of 6-hydroxy-3-acetylpyrid-2-one.

It is an object of the present invention to provide new azo dyes whose diazo component is derived from 4-amino-7-nitrobenzisothiazole derivatives and which have a favorable range of application properties.

We have found that this object is achieved by the benzisothiazole-azo dyes of the formula I defined at the beginning.

Any alkyl appearing in the abovementioned formula I may be either straight-chain or branched.

If substituted phenyl appears in the above-mentioned formula I, suitable substituents are for example $C_1$–$C_4$-alkyl, $C_1$–$C_4$-alkoxy, cyano, fluorine, chlorine, bromine and nitro.

If substituted alkyl appears in the above-mentioned formula I, suitable substituents are for example hydroxyl, $C_5$–$C_7$-cycloalkoxy, phenoxy, $C_1$–$C_4$-alkoxycarbonyl, cyano, $C_1$–$C_8$-alkanoyloxy, benzoyloxy, phenyl, furyl and thienyl.

If alkyl which is interrupted by one or more oxygen atoms appears in the abovementioned formula I, it is preferably interrupted by from 1 to 3, in particular 1 to 2 oxygen atoms.

$R^1$ and $R^2$ are each for example methyl, ethyl, propyl, isopropyl, butyl, isobutyl or sec-butyl.

$R^1$ is further for example pentyl, isopentyl, neopentyl, tert-pentyl, hexyl, heptyl, octyl, 2-ethylhexyl, isooctyl, nonyl, isononyl, decyl, isodecyl, undecyl, dodecyl (isooctyl, isononyl and isodecyl are trivial names derived from oxo process alcohols—cf. Ullmanns Enzyklopädie der technischen Chemie, 4th edition, volume 7, pages 215–217, and volume 11, pages 435 and 436), 2-methoxyethyl, 2-ethoxyethyl, 2-propoxyethyl, 2-butoxyethyl, 2-(2-ethylhexyloxy)ethyl, 2-methoxypropyl, 3-methoxypropyl, 3-ethoxypropyl, 3-(2-ethylhexyloxy)propyl, 2-methoxybutyl, 4-methoxybutyl, 2-ethoxybutyl, 4-ethoxybutyl, 3,6-dioxaheptyl, 3,6-dioxaoctyl, 4,7-dioxaoctyl, 4,7-dioxanonyl, 3,6-dioxadecyl, 4,9-dioxatridecyl, benzyl, 1- or 2-phenylethyl, 8-phenyl-4,7-dioxaoctyl, 2-cyanoethyl, 3-cyanopropyl, 4-cyanobutyl, 5-cyano-3-oxapentyl, 6-cyano-4-oxahexyl, 8-cyano-4-oxahexyl, 2-hydroxyethyl, 2- or 3-hydroxypropyl, 2,3-dihydroxypropyl, 2-hydroxybutyl, 4-hydroxybutyl, 5-hydroxy-3-oxapentyl, 6-hydroxy-4-oxahexyl, 8-hydroxy-4-oxaoctyl, 8-hydroxy-3,6-dioxaoctyl, 2-phenyl-2-hydroxyethyl, 2-chloroethyl, 2-bromoethyl, 2-phenoxyethyl, 3-phenoxypropyl, 4-phenoxybutyl, 5-phenoxy-3-oxapentyl, 6-phenoxy-4-oxahexyl, 8-phenoxy-4-oxaoctyl, 2-cyclohexyloxyethyl, 3-cyclohexyloxypropyl, 4-cyclohexyloxybutyl, 5-cyclohexyloxy-3-oxapentyl, 6-cyclohexyloxy-4-oxahexyl, 8-cyclohexyloxy-4-oxaoctyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, 5-methoxycarbonyl-3-oxapentyl, 6-methoxycarbonyl-4-oxahexyl, 8-methoxycarbon-yl-4-oxaoctyl, 2-formyloxyethyl, 2-acetyloxyethyl, 2-propionyloxyethyl, 2-butyryloxyethyl, 2-(2-ethylhexanoyloxy)ethyl, 2- or 3-acetyloxypropyl, 2- or 3-propionyloxypropyl, 2- or 3-(2-ethylhexanoyloxy)propyl, 4-acetyloxybutyl, 4-propionyloxybutyl, 4-(2-ethylhexanoyloxy)butyl, 5-acetyloxy-3-oxapentyl, 5-propionyloxy-3-oxapentyl-, 5-(2-ethylhexanoyloxy)-3-oxapentyl, 6-acetyloxy-4-oxahexyl, 6-propionyloxy-4-oxaoctyl, 6-(2-ethylhexanoyloxy)-4-oxahexyl, 8-acetyloxy-4-oxaoctyl, 8-propionyloxy-4-oxaoctyl, 8-(2-ethylhexanoyloxy)-4-oxaoctyl, 2-benzoyloxyethyl, 2- or 3-benzoyloxy-4-oxahexyl, 8-benzoyloxy-4-oxaoctyl, cyclopentyl, cyclohexyl, cycloheptyl, phenyl, 2-methylphenyl, 4-methylphenyl, 2,6-dimethylphenyl, 4-isopropylphenyl, 2-methoxyphenyl, 4-methoxyphenyl, 2,4-dimethoxyphenyl, 2-ethoxyphenyl, 2-chlorophenyl, 4-chlorophenyl, 2,4-dichlorophenyl, 4-bromophenyl, allyl, methallyl or fur-2-ylmethyl.

$R^4$ is for example methoxycarbonyl, ethoxycarbonyl, propoxycarbonyl, isopropoxycarbonyl or butoxycarbonyl.

Preference is given to benzisothiazole dyes of the formula I where X is hydrogen, chlorine, bromine or cyano, $R^4$ is cyano, and $R^1$, $R^2$ and $R^3$ are each as defined above.

Of particular utility are benzisothiazole-azo dyes of the formula I where X is hydrogen, chlorine, bromine or cyano and K is the radical of the formula II where $R^2$ is hydrogen or methyl and $R^1$ is as defined above.

To prepare the benzisothiazole-azo dyes of the formula I according to the present invention, a conventionally obtainable diazonium compound of an amine of the formula IV

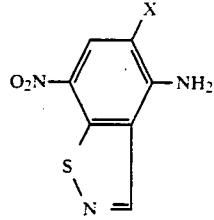

where X is as defined above, can be reacted with a coupling component of the formula IIa or IIIa

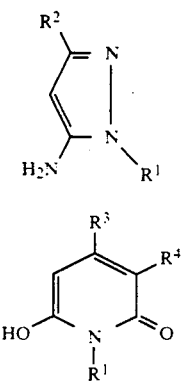

where $R^1$, $R^2$, $R^3$ and $R^4$ are each as defined above, in a conventional manner.

Further details of the preparation may be found in the Examples.

4-Amino-7-nitrobenzisothiazoles of the formula IV are known per se and described for example in DE-A-2 738 885, DE-A-2 727 383 and DE-A-2 020 479 as diazo components.

The dyes according to the present invention are yellow to red and notable for good light fastness, fastness to dry heat setting and pleating and high affinity. They are advantageous for dyeing synthetic fiber materials, such as polyamides, cellulose esters or blends of polyesters and cellulose fibers. They are suitable in particular for dyeing synthetic polyesters.

The Examples that follow further illustrate the invention. In the Examples, percentages are by weight, unless otherwise stated.

EXAMPLE 1

5.5 g of 4-amino-5-cyano-7-nitrobenzisothiazole were added to 13.5 ml of 85 % strength sulfuric acid and 7.5 ml of 3:1 (v/v) glacial acetic acid/propionic acid. 8.6 g of nitrosylsulfuric acid (11.5% of $N_2O_3$) were added dropwise at 0°–5° C., and the mixture was stirred at 0°–5° C. for 4 hours.

The above-prepared diazonium salt solution was added dropwise at 0° C. to 4.5 g of 5-amino-1-benzyl-pyrazole, dissolved in 50 ml of N,N-dimethylformamide, 100 g of ice and 0.3 g of amidosulfuric acid together with a further 300 g of ice. The mixture was stirred at 0°–5° C. for 4 hours, slowly warmed to room temperature and filtered with suction, and the filter residue was washed and dried.

Yield: 7.5 g of the dye of the formula

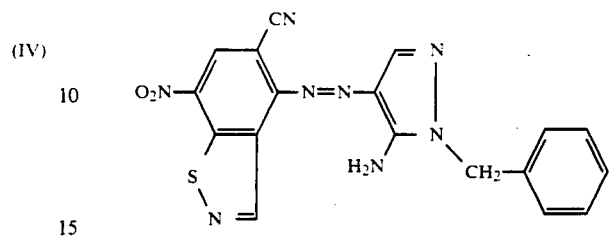

which dyes polyester material in fast red shades ($\lambda_{max}$ [$CH_2Cl_2$]: 529 nm).

EXAMPLE 2

6.85 g of 4-amino-5-bromo-7-nitrobenzisothiazole were diazotized and reacted with 4.5 g of 5-amino-1-benzylpyrazole both steps being carried out as described in Example 1. 11.4 g were obtained of the dye of the formula

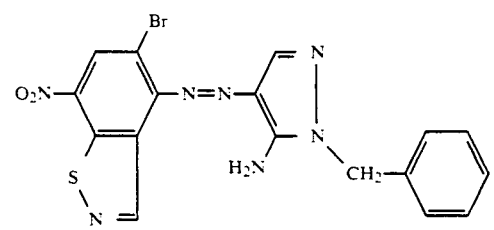

which dyes polyester in light-fast red shades which are also fast to dry heat setting and pleating ($\lambda_{max}$ [$CH_2Cl_2$]: 504 nm).

EXAMPLE 3

Example 2 was repeated, except that the 5-amino-1-benzylpyrazole was replaced by 5.7 g of 1-butyl-3-cyano-6-hydroxy-4-methylpyrid-2-one. 12.0 g were obtained of the dye of the formula

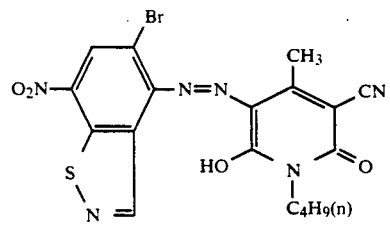

which dyes polyester fibers in fast reddish yellow shades ($\lambda_{max}$ [$CH_2Cl_2$]: 471 nm).

The same method was used to obtain the dyes listed below in Tables 1 and 2.

TABLE 1

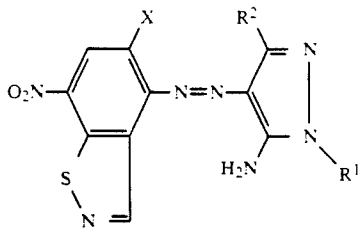

| Example No. | X | R¹ | R² | Hue on polyester (PES) |
|---|---|---|---|---|
| 4 | CN | $C_6H_5$ | $CH_3$ | red |
| 5 | CN | cyclohexyl-H | H | red |
| 6 | CN | $C_6H_5$ | H | red |
| 7 | Cl | $CH_2C_6H_5$ | H | red |
| 8 | Cl | cyclohexyl-H | H | red |
| 9 | Br | $C_6H_5$ | $CH_3$ | red |
| 10 | Br | $CH_3$ | H | red |
| 11 | Br | $CH_2$-furyl | H | red |
| 12 | Br | $C_6H_5$ | H | red |
| 13 | H | $CH_2C_6H_5$ | H | orange |
| 14 | H | $C_6H_5$ | $CH_3$ | orange |
| 15 | H | cyclohexyl-H | H | orange |

TABLE 2

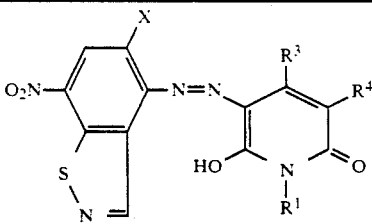

| Ex. No. | X | R¹ | R³ | R⁴ | Hue on polyester (PES) |
|---|---|---|---|---|---|
| 16 | CN | $CH_3$ | $CH_3$ | CN | reddish yellow |
| 17 | CN | $C_3H_6OCH_2C_6H_5$ | $CH_3$ | CN | reddish yellow |
| 18 | CN | $C_6H_{13}$ | $CH_3$ | CN | reddish yellow |
| 19 | Br | $C_3H_6OC_2H_4OC_6H_5$ | $CH_3$ | CN | reddish yellow |
| 20 | Br | $C_3H_7$ | $CH_3$ | CN | reddish yellow |
| 21 | Br | $CH_2CH_2(C_2H_5)C_4H_9$ | $CH_3$ | CN | reddish yellow |
| 22 | Br | $C_2H_5$ | $CH_3$ | CN | reddish yellow |
| 23 | Cl | $C_3H_6OCH_2C_6H_5$ | $CH_3$ | CN | reddish yellow |

TABLE 2-continued

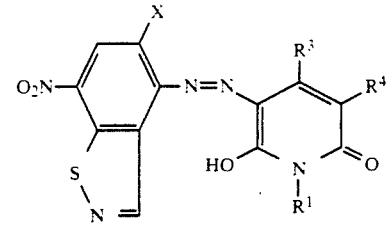

| Ex. No. | X | R¹ | R³ | R⁴ | Hue on polyester (PES) |
|---|---|---|---|---|---|
| 24 | H | $CH_3$ | $CH_3$ | CN | yellow |
| 25 | H | $C_4H_9$ | $CH_3$ | CN | yellow |
| 26 | H | $C_3H_6OC_2H_4OCH_3$ | $CH_3$ | CN | yellow |
| 27 | H | $C_3H_6OCH_2C_6H_5$ | $CH_3$ | CN | yellow |
| 28 | H | $C_6H_{13}$ | H | CN | yellow |
| 29 | Br | $C_2H_5$ | H | CN | reddish yellow |
| 30 | Br | $CH_2CH(C_2H_5)C_4H_9$ | $CH_3$ | H | yellow |
| 31 | CN | $C_4H_9$ | $CH_3$ | H | yellow |
| 32 | Cl | $C_6H_{13}$ | $CH_3$ | $CONH_2$ | yellow |

We claim:

1. A benzisothiazole-azo dye of the formula (I)

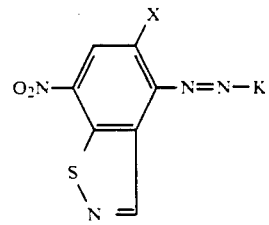

where X is hydrogen, bromine, cyano or nitro, and K is a radical of the formula (II)

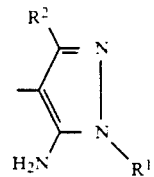

where $R^1$ is $C_1-C_{12}$ alkyl; $C_1-C_{12}$ alkyl substituted with hydroxy, $C_5-C_7$-cycloalkoxy, $C_1-C_4$-alkoxycarbonyl, $C_1-C_8$-alkanoyloxy, benzoyloxy, phenyl, furyl or thienyl; $C_1-C_4$ alkyl substituted with $C_1-C_8$-alkoxy, $C_1-C_4$ alkyl substituted with $C_1-C_4$-alkoxy further substituted with cyano, phenyl, hydroxy, hydroxy-$C_1-C_4$-alkoxy, $C_5-C_7$-cycloalkoxy, phenoxy, $C_1-C_4$-alkoxycarbonyl, $C_1-C_8$-alkanoyloxy, benzoyloxy, phenyl, furyl or thienyl; phenyl; phenyl substituted with $C_1-C_4$-alkyl, cyano, fluorine, chlorine, bromine or nitro; $C_3-C_5$-alkenyl or $C_5-C_7$-cycloalkyl; and $R^2$ is hydrogen or $C_1-C_4$-alkyl.

2. A benzisothiazole-azo dye as claimed in claim 1, wherein X is hydrogen, bromine or cyano and K is the radical of the formula II where $R^2$ is hydrogen or methyl and $R^1$ is as defined in claim 1.

3. The benzisothiazole-azo dye of claim 1, wherein $R^1$ is $C_1-C_{12}$ alkyl; $C_1-C_{12}$ alkyl substituted with phenyl or furyl; phenyl or phenyl substituted with $C_1$-$C_4$-alkyl, cyano, fluorine, chlorine, bromine or nitro; or $C_5$-$C_7$-cycloalkyl.

4. The benzisothiazole-azo dye of claim 3, wherein X is hydrogen or bromine, $R^1$ is phenyl or phenyl substituted with $C_1$-$C_4$-alkyl, fluorine, chlorine or bromine, and $R^2$ is $C_1$-$C_4$-alkyl.

5. The benzisothiazole-azo dye of claim 4, wherein X is hydrogen.

6. The benzisothiazole-azo dye of claim 5, wherein $R^1$ is phenyl and $R^2$ is methyl.

7. A method of dyeing synthetic fiber materials comprising dyeing a synthetic fiber material selected from the group consisting of polyamides, cellulose esters, polyesters, and blends of polyesters and cellulose fibers with a benzisothiazole-azo dye of the formula (I)

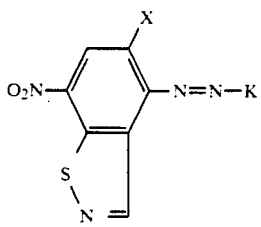

(I)

where X is hydrogen, bromine, cyano or nitro; and K is a radical of the formula (II)

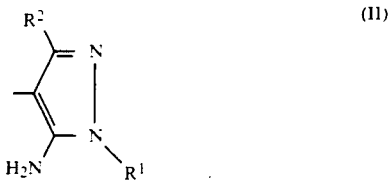

(II)

where $R^1$ is $C_1$-$C_{12}$ alkyl; $C_1$-$C_{12}$ alkyl substituted with hydroxy, $C_5$-$C_7$-cycloalkoxy, phenoxy, $C_1$-$C_4$-alkoxycarbonyl, $C_1$-$C_8$-alkanoyloxy, benzoyloxy, phenyl, furyl or thienyl; $C_1$-$C_4$ alkyl substituted with $C_1$-$C_8$-alkoxy; $C_1$-$C_4$ alkyl substituted with $C_1$-$C_4$-alkoxy further substituted with $C_1$-$C_4$-alkoxy, cyano, phenyl, hydroxy, hydroxy-$C_1$-$C_4$-alkoxy, $C_5$-$C_7$-cycloalkoxy, phenoxy, $C_1$-$C_4$-alkoxycarbonyl, $C_1$-$C_8$-alkanoyloxy, benzoyloxy, phenyl, furyl or thienyl; phenyl; phenyl substituted with $C_1$-$C_4$-alkyl, cyano, fluorine, chlorine, bromine or nitro; $C_3$-$C_5$-alkenyl or $C_5$-$C_7$-cycloalkyl; and $R^2$ is hydrogen or $C_1$-$C_4$-alkyl.

8. The method of claim 7, wherein X of said benzisothiazole-azo dye is hydrogen or bromine, $R^1$ is $C_1$-$C_{12}$ alkyl; $C_1$-$C_{12}$ alkyl substituted with phenyl or furyl; phenyl or phenyl substituted with $C_1$-$C_4$-alkyl, cyano, fluorine, chlorine, bromine or nitro; or $C_5$-$C_7$-cycloalkyl, and $R^2$ is $C_1$-$C_4$-alkyl.

9. The method of claim 7, wherein X of said benzisothiazole-azo dye is hydrogen, $R^1$ is phenyl and $R^2$ is methyl.

* * * * *